United States Patent
Radlow

(10) Patent No.: US 11,367,155 B1
(45) Date of Patent: *Jun. 21, 2022

(54) METHODS AND SYSTEMS FOR USE OF A PREPAID PAYMENT DEVICE FOR A HEALTHCARE SERVICE OR PRODUCT

(71) Applicant: CITICORP CREDIT SERVICES, INC. (USA), Long Island City, NY (US)

(72) Inventor: Andrew D. Radlow, Oakland, CA (US)

(73) Assignee: CITICORP CREDIT SERVICES, INC. (USA), Long Island City, NY (US)

( * ) Notice: Subject to any disclaimer, the term of this patent is extended or adjusted under 35 U.S.C. 154(b) by 288 days.

This patent is subject to a terminal disclaimer.

(21) Appl. No.: 16/700,173

(22) Filed: Dec. 2, 2019

Related U.S. Application Data

(63) Continuation of application No. 12/854,994, filed on Aug. 12, 2010, now Pat. No. 10,515,427.
(Continued)

(51) Int. Cl.
G06Q 30/04 (2012.01)
G06Q 20/08 (2012.01)
(Continued)

(52) U.S. Cl.
CPC .............. *G06Q 50/22* (2013.01); *G06Q 30/04* (2013.01); *G06Q 30/06* (2013.01)

(58) Field of Classification Search
CPC ......... G06Q 50/22; G06Q 30/04; G06Q 30/06
See application file for complete search history.

(56) References Cited

U.S. PATENT DOCUMENTS 3,376,661 A 4/1968 Hulett
3,399,473 A 9/1968 Jaffe
(Continued)

FOREIGN PATENT DOCUMENTS

DE 29713674 U1 2/1997
JP H03258596 A 11/1991
(Continued)

OTHER PUBLICATIONS

JP 2002-032686 published Jan. 31, 2002, abstract only in English, downloaded from PAJ, 1 paqe.
(Continued)

*Primary Examiner* — Maroun P Kanaan
(74) *Attorney, Agent, or Firm* — Foley & Lardner LLP

(57) ABSTRACT

The methods and systems disclosed herein attempt to overcome the deficiencies of the conventional methods and systems by providing a prepaid card for reimbursing a healthcare service provider for the cost of providing a patient with a specific healthcare service. A prepaid card can identify a specific healthcare service and can be used by a patient at a healthcare service provider to obtain the healthcare service of administering a controlled substance for which the patient does not have a prescription. The prepaid card can be associated with one or more accounts of third parties who may be financially responsible for reimbursing the healthcare service provider for the cost of providing the controlled substance and/or the specific healthcare service to the patient.

19 Claims, 6 Drawing Sheets

Related U.S. Application Data

(60) Provisional application No. 61/234,262, filed on Aug. 14, 2009.

(51) Int. Cl.
*G06Q 50/22* (2018.01)
*G06Q 30/06* (2012.01)

(56) References Cited

U.S. PATENT DOCUMENTS

| | | | |
|---|---|---|---|
| 4,091,448 | A | 5/1978 | Clausing |
| 4,443,027 | A | 4/1984 | McNeely |
| 4,634,848 | A | 1/1987 | Shinohara et al. |
| 4,700,055 | A | 10/1987 | Kashkashian, Jr. |
| 4,707,594 | A | 11/1987 | Roth |
| 4,797,542 | A | 1/1989 | Hara |
| 4,918,631 | A | 4/1990 | Hara |
| 5,025,372 | A | 6/1991 | Burton et al. |
| 5,276,311 | A | 1/1994 | Hennige |
| 5,326,964 | A | 7/1994 | Risser |
| 5,357,563 | A | 10/1994 | Hamilton et al. |
| 5,530,232 | A | 6/1996 | Taylor et al. |
| 5,544,246 | A | 8/1996 | Mandelbaum |
| 5,578,808 | A | 11/1996 | Taylor |
| 5,585,787 | A | 12/1996 | Wallerstein |
| 5,590,038 | A | 12/1996 | Pitroda |
| 5,627,355 | A | 5/1997 | Rahman et al. |
| 5,649,118 | A | 7/1997 | Carlisle et al. |
| 5,770,843 | A | 6/1998 | Rose et al. |
| 5,794,234 | A | 8/1998 | Church et al. |
| 5,844,230 | A | 12/1998 | Lalonde |
| 5,859,419 | A | 1/1999 | Wynn |
| 5,883,377 | A | 3/1999 | Chapin, Jr. |
| 5,907,142 | A | 5/1999 | Kelsey |
| 6,000,608 | A | 12/1999 | Dorf |
| 6,024,286 | A | 2/2000 | Bradley |
| 6,032,136 | A | 2/2000 | Brake, Jr. |
| 6,089,451 | A | 7/2000 | Krause |
| 6,095,416 | A | 8/2000 | Grant |
| 6,131,811 | A | 10/2000 | Gangi |
| 6,182,895 | B1 | 2/2001 | Albrecht |
| 6,188,309 | B1 | 2/2001 | Levine |
| 6,189,787 | B1 | 2/2001 | Dorf |
| 6,266,647 | B1 | 7/2001 | Fernandez |
| 6,267,292 | B1 | 7/2001 | Walker et al. |
| 6,325,293 | B1 | 12/2001 | Moreno |
| 6,398,115 | B2 | 6/2002 | Krause |
| 6,402,029 | B1 | 6/2002 | Gangi |
| 6,427,909 | B1 | 8/2002 | Barnes |
| 6,494,367 | B1 | 12/2002 | Zacharias |
| 6,594,640 | B1 | 7/2003 | Postrel |
| 6,601,761 | B1 | 8/2003 | Katis |
| 6,820,061 | B2 | 11/2004 | Postrel |
| 6,829,586 | B2 | 12/2004 | Postrel |
| 6,842,739 | B2 | 1/2005 | Postrel |
| 6,847,935 | B1 | 1/2005 | Soloman et al. |
| 6,889,198 | B2 | 5/2005 | Kawan |
| 6,947,898 | B2 | 9/2005 | Postrel |
| 7,054,830 | B1 | 5/2006 | Eggleston et al. |
| 7,090,138 | B2 | 8/2006 | Rettenmeyer et al. |
| 7,096,190 | B2 | 8/2006 | Postrel |
| 7,566,000 | B2 | 7/2009 | Agostino et al. |
| 7,996,260 | B1 * | 8/2011 | Cunningham ......... G06Q 30/02 705/14.1 |
| 8,412,623 | B2 | 4/2013 | Moon et al. |
| 8,682,791 | B2 | 3/2014 | Bies et al. |
| 2001/0001204 | A1 | 5/2001 | Campisano |
| 2001/0016827 | A1 | 8/2001 | Fernandez |
| 2001/0032134 | A1 | 10/2001 | Hardesty |
| 2002/0003169 | A1 | 1/2002 | Cooper |
| 2002/0029191 | A1 | 3/2002 | Ishibashi |
| 2002/0055909 | A1 | 5/2002 | Fung et al. |
| 2002/0123926 | A1 | 9/2002 | Bushold et al. |
| 2002/0152123 | A1 | 10/2002 | Giordano et al. |
| 2002/0161630 | A1 | 10/2002 | Kern et al. |
| 2002/0174055 | A1 | 11/2002 | Dick et al. |
| 2002/0188501 | A1 | 12/2002 | Lefkowith |
| 2002/0188511 | A1 | 12/2002 | Johnson et al. |
| 2002/0198803 | A1 | 12/2002 | Rowe |
| 2003/0115100 | A1 | 6/2003 | Teicher |
| 2003/0149625 | A1 | 8/2003 | Leonardi et al. |
| 2003/0171992 | A1 | 9/2003 | Blagg et al. |
| 2003/0212642 | A1 | 11/2003 | Weller et al. |
| 2003/0220834 | A1 | 11/2003 | Leung et al. |
| 2003/0229539 | A1 | 12/2003 | Algeine |
| 2004/0030601 | A1 | 2/2004 | Pond et al. |
| 2004/0122736 | A1 | 6/2004 | Strock et al. |
| 2004/0138999 | A1 | 7/2004 | Friedman et al. |
| 2004/0186770 | A1 | 9/2004 | Pettit et al. |
| 2004/0238622 | A1 | 12/2004 | Freiberg |
| 2005/0021399 | A1 | 1/2005 | Postrel |
| 2005/0021400 | A1 | 1/2005 | Postrel |
| 2005/0021401 | A1 | 1/2005 | Postrel |
| 2005/0065819 | A1 | 3/2005 | Schultz |
| 2005/0086167 | A1 | 4/2005 | Brake, Jr. et al. |
| 2005/0107155 | A1 | 5/2005 | Potts et al. |
| 2005/0149394 | A1 | 7/2005 | Postrel |
| 2005/0251446 | A1 | 11/2005 | Jiang et al. |
| 2006/0113376 | A1 | 6/2006 | Reed et al. |
| 2006/0129426 | A1 | 6/2006 | Pearson |
| 2006/0129427 | A1 | 6/2006 | Wennberg |
| 2006/0161478 | A1 | 7/2006 | Turner et al. |
| 2006/0184419 | A1 | 8/2006 | Postrel |
| 2006/0195359 | A1 | 8/2006 | Robinson et al. |
| 2006/0208064 | A1 | 9/2006 | Mendelovich et al. |
| 2006/0224451 | A1 | 10/2006 | Kerschbrock et al. |
| 2006/0249575 | A1 | 11/2006 | Turner et al. |
| 2006/0253320 | A1 | 11/2006 | Heywood |
| 2006/0259362 | A1 | 11/2006 | Cates |
| 2006/0259364 | A1 | 11/2006 | Strock et al. |
| 2007/0005403 | A1 | 1/2007 | Kennedy et al. |
| 2007/0106607 | A1 | 5/2007 | Seib et al. |
| 2007/0198432 | A1 | 8/2007 | Pitroda et al. |
| 2008/0010096 | A1 | 1/2008 | Patterson et al. |
| 2008/0065554 | A1 | 3/2008 | Hogan et al. |
| 2008/0177574 | A1 | 7/2008 | Gonzalez |
| 2009/0083065 | A1 | 3/2009 | Unland et al. |
| 2009/0271315 | A1 * | 10/2009 | Hammad ............ G06Q 20/322 705/41 |
| 2009/0287600 | A1 | 11/2009 | Amorosa et al. |
| 2010/0010909 | A1 | 1/2010 | Marshall et al. |

FOREIGN PATENT DOCUMENTS

| | | |
|---|---|---|
| JP | H10-302160 A | 11/1998 |
| JP | 2000-259876 A | 9/2000 |
| JP | 2001-243350 A | 9/2001 |
| JP | 2002-32686 A | 1/2002 |
| JP | 2002-083145 A | 3/2002 |
| JP | 2002-157631 A | 5/2002 |
| JP | 2008-545210 A | 12/2008 |
| KR | 2002-0045301 A | 6/2002 |
| KR | 10-0457099 B1 | 11/2004 |
| WO | 2001029789 A1 | 4/2001 |
| WO | 2001069556 A1 | 9/2001 |
| WO | 2007005021 A1 | 1/2007 |

OTHER PUBLICATIONS

Australian Office Action dated Mar. 9, 2011 in related Application No. 2010212457, 2 pages.
Beason, PrivaSys Introduces PIN-Driven Secure Card Technology, PR Newswire, 2001, 2 pages.
Beason, PrivaSys Launches Interactive, Electronic Secure Card and is Chosen for the Prestigious Hot Seat at Demo 2002, PR Newswire, 2002, 2 pages.
Chinese First Office Action dated Jan. 9, 2009 in related Application No. 03815523.0, includes English Translation, 3 pages.
Chinese Second Office Action dated Jun. 26, 2009 in related Application No. 03815523.0, includes English Translation, 14 pages.
Chinese Third Office Action dated Feb. 5, 2010 in related Application No. 03815523.0, includes English Summary, 6 pages.

(56) References Cited

OTHER PUBLICATIONS

DE297 13674 published Sep. 25, 1997, Abstract only in English, 1 page.
European Communication dated Mar. 11, 2009 in related Application No. 03764643.7, 8 pages.
European Communication dated Oct. 15, 2009 in related Application No. 03764643,7, 13 pages.
European Communication dated Aug. 23, 2007 in related Application No. 03764643.7, 6 pages.
International Preliminary Examination Report dated Jan. 6, 2006 in related Application No. PCT/US03/22018 filed Jul. 15, 2003, 2 pages.
International Search Report dated Feb. 24, 2010 in related Application No. PCT/US2010/045445 filed Aug. 13, 2010, 4 pages.
International Search Report dated Mar. 29, 2011 in related Application No. PCT/US2010/45500 filed Aug. 13, 2010, 3 pages.
International Search Report dated Nov. 5, 2004 in related Application No. PCT/US03/22018 filed Jul. 15, 2003, 4 pages.
JP3258596 published Nov. 18, 1991, abstract only in English, downloaded from esp@enet.com, 1 page.
JP1998302 (Jp 10-302160) published Nov. 13, 1998, abstract only in English, downloaded from PAJ, 1 page.
JP2000259876 published Sep. 22, 2000, abstract only in English, downloaded from esp@enet.com, 1 page.
JP20001243350 published Sep. 7, 2001, abstract only in English, downloaded from esp@enet.com, 1 page.
JP2002083145 published Mar. 22, 2002, abstract only in English, downloaded from PAJ, 1 page.
JP2002157631 published May 31, 2005, English translation, abstract downloaded from PAJ, complete English translation obtained from JPO, 23 pages.
Japanese Office Action in related Application No. 2004-521813 with English language translation dated Mar. 30, 2009, 7 pages.
Korean Office Action dated May 18, 2010 in related Application No. 10-2004-7020962, includes English translation, 11 pages.
KR 2002-0045301 published Jun. 19, 2002, English language translation, 9 pages.
KR 10-0457099 published Nov. 16, 2004, English language translation, 12 pages.
Kutler, is banking finally ready for smart cards? American Banker, 1992, vol. 157, No. 129, 5 pages.
Philippine Office Action in English dated Nov. 7, 2006 in related Application No. 12004502096 filed Dec. 21, 2004, 2 pages.
Philippine Office Action in English dated Mar. 19, 2009 in related Application No. 12004502096 filed Dec. 21, 2004, 2 pages.
Polish Office Action English Summary dated Feb. 15, 2010, in related Application No. P-374297, 2 pages.
Polish Office Action English Summary dated Apr. 7, 2009, in related Application No. P-374297, 2 pages.
Polish Office Action English Summary dated Aug. 28, 2008, in related Application No. P-374297, 2 pages.
Ruddock, One card versus multiple card products, Business credit, 2000, vol. 12, No. 5, 8 pages.
Supplemental European Search Report for Application No. EP 03764643, dated Aug. 11, 2006, 3 pages.
Weinstein, Plastic Card Industry Faces a Forked Road: User Security and New Services Will Steer Course of Electronic Funds Transfers, American Banker, 1984, 6 pages.
"Winn-Dixie Rolls Out Prepaid Health Insurance Cards," Russell Redman, Chain Drug Review, Oct. 28, 2009, 1 page.
"CVS Offers Prepaid Health Cards in Florida Stores," Russell Redman, Chain Drug Review, Nov. 16, 2009, 1 page.
"Givewell.com—Give the Gift of Health: The Prepaid Debit Card, a Highmark Product," 2007, http://web.archive.org/web/20071104124914/http://www.givewell.com/how-it-works/, 3 pages.
"Novartis Vaccines Launches National Gift-Giving Program to Help Protect Loved Ones by Reserving an Influenza Vacinnation," PR Newswire, Cambridge, Mass, Oct. 3, 2007, 4 pages.
Prepaid medical cards for single use—Google Search, https://www.google.com/search?q=prepaid+cards+authorized+for+specific+healthcare, Oct. 31, 2015.
Prepaid flu vaccine cards—Google Search, https://www.google.com/search?q=prepaid+cards+authorized+for+specific+healthcare, Oct. 31, 2015.
Treatment is authorized for a prepaid amount—Google Search, https://www.google.com/search?q=prepaid+cards+authorized+for+specific+healthcare, Oct. 31, 2015.
Prepaid cards authorized for specific healthcare treatments—Google Search, https://www.google.com/search?q=prepaid+cards+authorized+for+specific+healthcare, Oct. 31, 2015.

\* cited by examiner

METHODS AND SYSTEMS FOR USE OF A PREPAID PAYMENT DEVICE FOR A HEALTHCARE SERVICE OR PRODUCT

CROSS-REFERENCE TO RELATED APPLICATIONS

This application is a continuation of U.S. patent application Ser. No. 12/854,994, filed on Aug. 12, 2010, titled "Methods and Systems For Use Of A Prepaid Payment Device For A Healthcare Service Or Product," which claims priority to U.S. Provisional Patent Application Ser. No. 61/234,262, titled "Vaccine Redemption Prepaid Card Through Payment Processing System," filed on Aug. 14, 2009, each of which is hereby incorporated by reference in its entirety.

FIELD

The present invention relates generally to a prepaid card for reimbursing a healthcare service provider for the cost of providing a patient with a specific healthcare service or product.

BACKGROUND

A vaccine is a biological preparation that improves immunity to a particular disease. A vaccine typically contains a small amount of an agent that resembles a microorganism. The agent stimulates the body's immune system to recognize the agent as foreign, destroys it, and "remembers" it, so that the immune system can more easily recognize and destroy any of these microorganisms that it later encounters. Vaccines can be prophylactic (e.g. to prevent or ameliorate the effects of a future infection by any natural or "wild" pathogen), or therapeutic (e.g. vaccines against cancer are also being investigated; see cancer vaccine).

As the drug used in a vaccine is typically a controlled substance regulated by a governmental body, rather the self medicating as an over-the-counter drug, a patient normally must have the vaccine administered a healthcare service provider. The cost of the vaccine, as well as the cost of administering the vaccine to the patient, are typically paid for by an insurance company, where the patient is either the insured or a person for which the patient is financially responsible. After receiving a vaccine, a claim is filed for the insured for the cost of the healthcare goods and services against an insurance policy of the insured. Upon adjudication of the claim, the insurance company pays the healthcare service provider for the cost of the vaccine and the cost of administering the vaccine to the patient.

A patient's vaccine is typically paid for by the patient's insurance company. Substantiation of a healthcare service provided by a healthcare service provider for an insured's insurance policy, and adjudication of the resultant insurance claim for the healthcare service so provided can involve numerous parties that are required to perform numerous functions. Often, these functions must be performed at substantial overhead costs and before the health service provider can be reimbursed for rendering the healthcare service to the patient. It would be an advantage in the relevant arts to provide healthcare service payments to healthcare service providers, such as for vaccine shots, without insurance claims system adjudication by a healthcare benefits management entity. Also, there is a need for a system that reduces the costs incurred by healthcare service providers and their patients in the former providing healthcare services to the latter.

SUMMARY

The methods and systems disclosed herein attempt to overcome the deficiencies of the conventional methods and systems by providing a prepaid card for reimbursing a healthcare service provider for the cost of providing a patient with a specific healthcare product or service. A prepaid card can identify a specific healthcare service and can be used by a patient at a healthcare service provider to obtain the healthcare service of administering a controlled substance for which the patient does not have a prescription. The prepaid card can be associated with one or more accounts of third parties who may be financially responsible for reimbursing the healthcare service provider for the cost of providing the controlled substance and/or the specific healthcare service to the patient.

Disclosed implementations include a portable payment device having a substrate in contact with memory having encoded data corresponding to a specific healthcare service to be rendered to a patient by a healthcare service provider by administering a controlled substance for which the patient does not have a prescription, where the portable payment device is associated with one or more accounts of third parties who are financially responsible for reimbursing the healthcare service provider for the cost of providing the controlled substance and the specific healthcare service to the patient. The portable payment device can be used to identify the patient, and identification can be used to determine which products or services are authorized for that patient. If the patient is authorized for a product, a prescription may not be needed for the patient to receive the product. In other implementations, the portable payment device is a prepaid card, or equivalent voucher, that is an open loop card that is accepted by many different healthcare service providers who will provide the patient with the specific healthcare service. In still further implementations, the prepaid card may not identify the patient so that, in processing payment for the healthcare service, the patient can be anonymous to the entities in the payment processing system (e.g., issuer, acquirer and transaction handler) as well as to the healthcare service provider who provides the specific healthcare service to the patient. The healthcare service provider is reimbursed from an account identified by data on the prepaid card. The identified account can correspond to one or more sponsors who are financially responsible to reimburse the healthcare service provider for rendering the specific healthcare service to the patient. As such, the authorization for the cost of the service, and its guaranteed payment to the healthcare service provider, can be provided in real time, without a benefits manager adjudication, and without an insurance claims system process. The methods and systems herein can use an automatic and electronic substantiation that is more efficient than traditional substantiation.

The embodiments described herein can present a few advantages over conventional methods. For example, the systems and methods described herein can reduce cost and simplify billing for routine healthcare products and services. In another example, employees or beneficiaries can be directed to lower cost, yet high quality pharmacy partner locations. In yet another example, employees or beneficiaries can receive improved access and convenience by receiving a healthcare service (e.g., a vaccination) with no outof-pocket expenses. Healthcare services may be less expensive at locations other than a doctor's office, so healthcare services may be provided at a lower cost by retail pharmacy partners at a discounted rate. Also, costs can be reduced because payments are only made for administered healthcare services. Further, because a prepaid card or printed voucher can be directed to all employees and their dependents, a greater percentage of the total population can be appropriately vaccinated or treated, whereas conventional approaches typically outreach to only employees. Additionally, the systems and methods described herein can reduce absenteeism from work and the costs for a doctor's office, hospitalization, or drugs. The use of a prepaid card or printed voucher also provides services with reduced paperwork, receipts, and claims.

In one embodiment, a computer-implemented method comprises receiving, by a point of sale (POS) terminal of a healthcare provider, a prepaid card, wherein the prepaid card comprises a first identifier encoded on the prepaid card that identifies a recipient of a healthcare service or product for determining whether the healthcare service is authorized for a prepaid amount; and a second identifier encoded on the prepaid card for an account of an account holder who is financially responsible for paying the healthcare service provider for administering the specific healthcare service or product to the recipient; reading, with the POS terminal, the first identifier for the recipient; reading, with the POS terminal, the second identifier for the account from the prepaid card; and receiving an input regarding the healthcare service or product administered to the recipient.

In another embodiment, a payment device comprises a portable tangible object including a first identifier for identifying an anonymous or specified entity to receive the benefit of a prepaid healthcare service or product; and a second identifier for identifying an account issued to an account holder by an issuer and upon which a transaction can be conducted between the anonymous or the specified entity and any of a predetermined set of healthcare providers, wherein the transaction is limited to the sale of the predetermined healthcare service or product; and means by which the first and second identifiers can be read from the portable tangible object for authorizing the prepaid healthcare service or product.

In yet another embodiment, a computer-implemented method for pre-paying for a healthcare service or product, the method comprises receiving, by a computer, a request from a sponsoring entity to pay for a predetermined healthcare service of a beneficiary from an account of the sponsoring entity; storing, by a computer, a record associating the predetermined healthcare service for the beneficiary with an account of the sponsoring entity; designating, by a computer, an identifier for the account of the sponsoring entity; providing a portable tangible object to the beneficiary that includes the identifier of the account of the sponsoring entity; receiving, by a computer, a request for payment from the account of the sponsoring entity after the administration of the predetermined healthcare service to the beneficiary; and determining, by a computer, whether the requested payment is authorized.

In still yet another embodiment, a computer-implemented method for payment of a healthcare service or product, the method comprises processing, by a computer of an issuer, the payment for a healthcare service or produce using a prepaid card, wherein the prepaid card comprises a first identifier encoded on the prepaid card that identifies a recipient of a healthcare service or product for determining whether the healthcare service is authorized for a prepaid amount; and a second identifier encoded on the prepaid card for an account of an account holder who is financially responsible for paying the healthcare service provider for administering the specific healthcare service or product to the recipient.

In yet another embodiment, a payment device comprises a portable tangible object including an identifier for a flu vaccine; and an identifier for an account issued to an account holder by an issuer and upon which a transaction can be conducted between a bearer of the payment device and any of a predetermined set of healthcare providers, wherein the transaction is limited to the sale of a service of administering the flu vaccine; the identifiers are sufficient for a determination by the issuer whether one said healthcare provider is authorized to administer the flu vaccine and conduct the transaction on the account for the administration of the flu vaccine; and means by which the identifiers can be read from the portable tangible object.

Additional features and advantages of an embodiment will be set forth in the description which follows, and in part will be apparent from the description, or may be learned by practice of the invention. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

Figure 1:
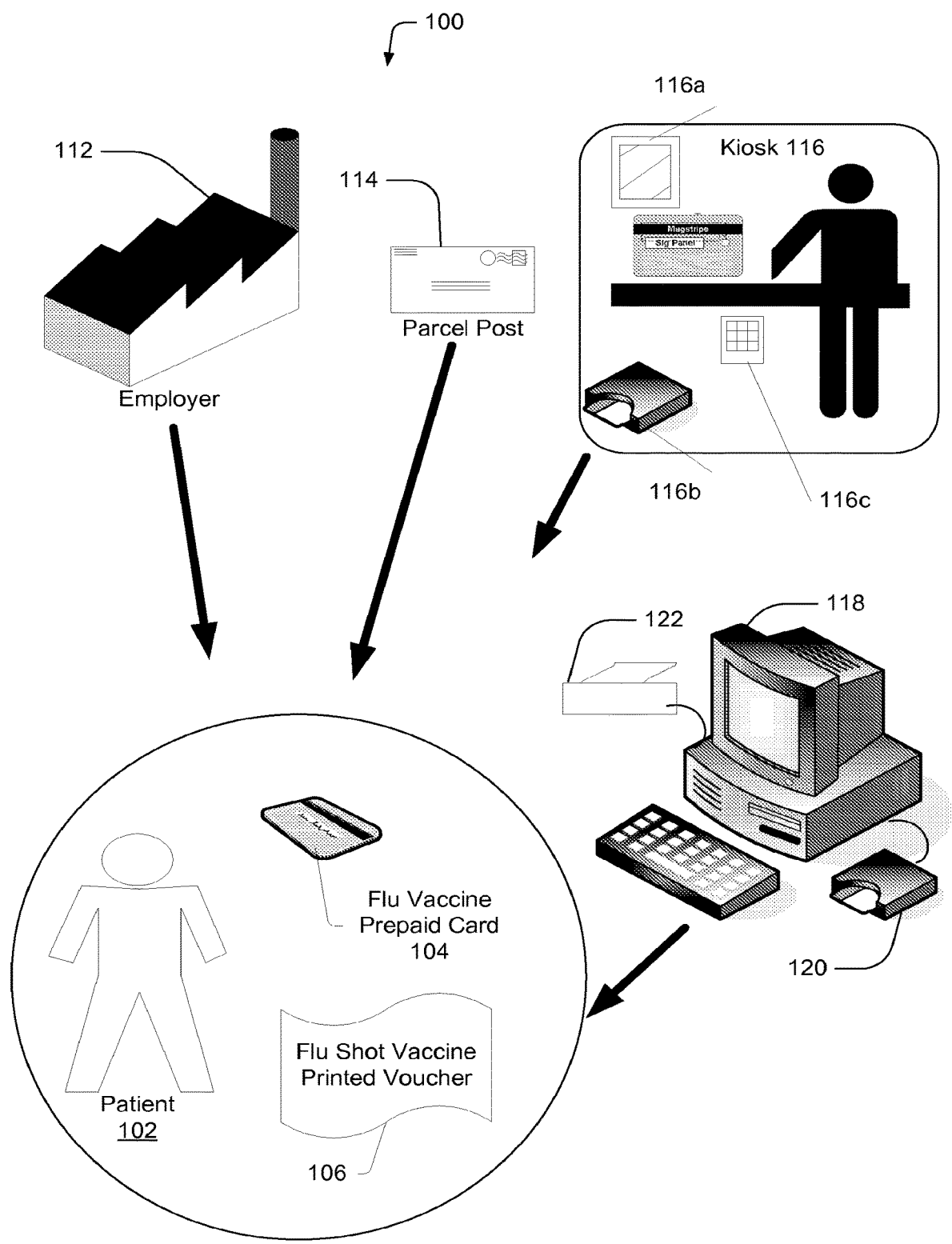
FIG. 1 illustrates an exemplary environment for delivery of prepaid card, or their equivalent, to a patient who is to receive a specific healthcare service to be paid for from an account identified by data encoded on the prepaid card, according to an exemplary embodiment.

Reference will now be made in detail to the preferred embodiments of the present invention, examples of which are illustrated in the accompanying drawings.

The present discussion considers a prepaid card that can be used by a patient for a specific healthcare service or product. The patient can be an employee of a company, a subscriber of a healthcare insurance plan, a member of a healthcare insurance plan, a recipient of a service who benefits from a payment by a sponsoring entity, or other beneficiary to receive a designated healthcare service.

By way of example, and not by way of limitation, a healthcare service may be referred to herein as an influenza (i.e., "flu") vaccine. Although the exemplary embodiment describes a flu vaccine, the methods and systems described herein can also be applied to other vaccines (e.g., shingle or chicken pox) and healthcare provider services and products (e.g., over-the-counter medications or treatment of at risk conditions). In various implementations, an issuer of an account (of a sponsoring entity or employer) would partner with businesses, non-profits, and/or government agencies to issue a prepaid card. The account would provide funds, supplied by the partners, to healthcare providers to reimburse them for providing flu vaccines to patients who presented a valid flu vaccine prepaid card. The prepaid card would be used by patients to obtain a flu vaccine from participating healthcare service providers, such as retailers with flu shot clinics (e.g., supermarkets, "big box" stores), doctors, and medical facilities and other such merchants, without the patients needing to pay the healthcare service provider for the flu vaccine. The prepaid card can be a plastic magnetic stripe card to facilitate authorization, clearing, and settlement through a typical point of sale (POS) terminal and related systems and processes that such merchants would typically use for other transactions with consumer-account holders who conduct transactions on accounts that are processed by a payment processing network. The prepaid card can be a stored value card, a smart card, a multi-account card, or any other type of card capable of identifying a patient and determining whether there is a partial or complete authorization for payment of a product or service for that patient and, optionally, from which healthcare provider locations.

Although the exemplary embodiments describe an employer as requesting a prepaid card for a employee, it is intended that any entity or individual can request or sponsor the prepaid card for themselves or another entity or individual as a beneficiary. The sponsoring entity may be financially responsible for paying for the healthcare service provided by the healthcare provider on behalf of the patient (i.e., the beneficiary). The employer may also be referred to herein as an account holder or an account user.

The requesting or sponsoring entity can be a private or public entity. In one example, the requesting entity can be a state or federal government. A state government may provide prepaid cards to Medicare/Medicaid members, current government employees, retired government employees, and underprivileged children. In another example, a government entity may request prepaid cards for residents of its jurisdiction.

FIG. 1 shows examples of who a patient 102 may receive a prepaid card 104 or an equivalent voucher 106 to be used for payment in the administration of a healthcare service, such as a flu vaccine. An employer 112 of the patient 102, or a person or entity who is financially responsible for the patient 102, may distribute a prepaid card to each of its employees. Alternatively, a healthcare insurance company or a financial institution can issue the prepaid card to each of the plan subscribers (i.e., employees) or members (e.g., family members of the employee) for a particular employer 112. The prepaid card 104 can be ordered from an issuer (e.g., a financial institution), or its agents, and received via a postal service 114. The prepaid card 104 can also be made available to patients at a predetermined location, e.g., a bank, store, pharmacy, or hospital. In another example, a prepaid card can be requested online, whereby a requesting entity can pay for one or more prepaid cards and have the cards distributed to certain recipients. In yet another example, a prepaid card dispensing kiosk 116 can dispense the prepaid card 104. The prepaid card dispensing kiosk 116 can include a display 116a, a card writing and dispensing mechanism 116b, and a keypad 116c. In one example, the prepaid card dispensing kiosk 116 can be an ATM.

Alternatively, a paper voucher 106 can be rendered by a printer 122 in communication with a computing apparatus 118 (e.g., a patient's personal computer or a prepaid card dispensing kiosk 116) operated by the patient 102, or agent thereof, whereby the paper voucher 106 encodes an account of a vaccine sponsor. Data rendered with the paper voucher 106 can be received via the World Wide Web and/or Internet from the vaccine sponsor or agent thereof The paper voucher 106 can include the same information as the prepaid card 104. The paper voucher 106 can include a barcode or other information to be scanned for authorization and processing. In one example, the paper voucher 106 has a unique identification number for each patient using the paper voucher 106, whereby the unique number cannot be shared by patients. Although the exemplary embodiments describe a prepaid card 104 or the printed voucher 106, it is intended that any portable, tangible objects that can convey the requisite information can be used. The prepaid card 104 or the printed voucher 106 can be used for a portion or all of a payment of a particular healthcare service.

Figure 2:
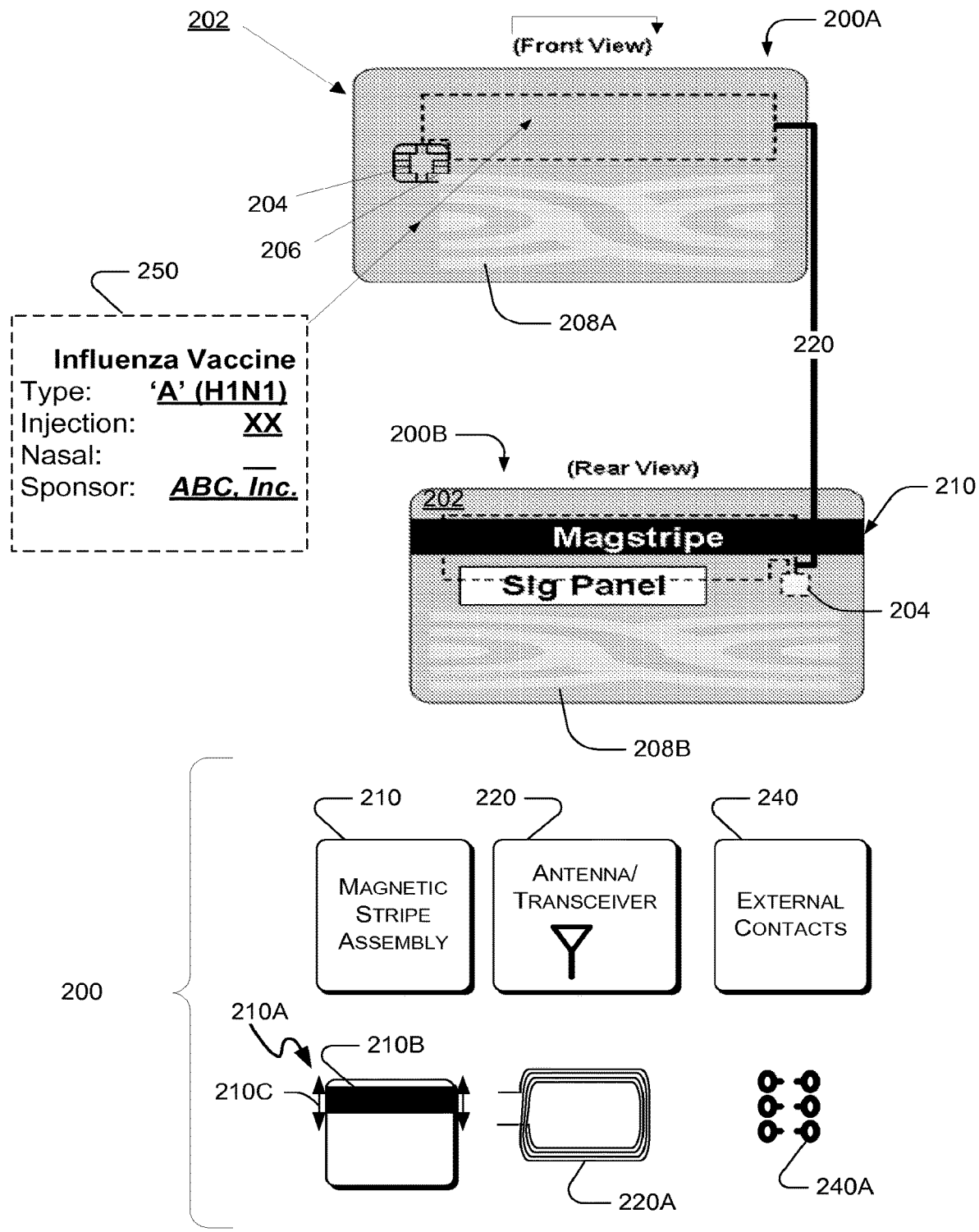
FIG. 2 illustrates possible alternative implementations of a prepaid card, according to an exemplary embodiment.

Referring to FIG. 2, both a front view 200A and a rear view 200B of an exemplary flu vaccine prepaid card 202 are presented. Images may be displayed on one or both sides of flu vaccine prepaid card 202, with image 208A on the front view 200A being either the same as or different from image 208B on the rear view 200B. In this illustration, the front view 200A also displays information 250 about the provider of the flu vaccine prepaid card, the recipient of the prepaid card, and/or the healthcare service provided by the prepaid card. As shown in the exemplary embodiment of FIG. 2, the information 250 can include the name of the vaccine (e.g., Influenza vaccine), the type (e.g., A (H1N1)), whether it is applied nasally, and the name of the sponsor (e.g., ABC, Inc.). Information 250 may be printed, embossed, or encoded on the prepaid card 202.

In one embodiment, an employer can request that an issuer provide a prepaid card to each of the employer's employees. In this example, the prepaid card will include a 16-digit account number, whereby a portion of the account number may be used to identify the employer, and a portion of the account number may be used to identify the employee. The employer will arrange with the issuer to pay for certain healthcare services or products. When the employee presents the prepaid card for payment of the rendered services or products, the issuer can identify the employee based on the account number and determine whether those rendered services or products are authorized as prepaid by the employer. In some instances, the name of the employee may be used in these records. In other instances, because of privacy concerns, the employee's name may be omitted from the process. In this exemplary embodiment, the information includes an identifier for the account of the employer and an identifier for the employee, who may be specified by name or be anonymous. Also, in this example, the prepaid card is not encoded with the identification of the prepaid healthcare service or product because, by allowing the issuer to determine which services or products are authorized, the prepaid card can more dynamically allow for various changes in the authorized services and products rather than issuing a new card to an employee for each product or service.

In another embodiment, a parent can purchase from a store a prepaid card for a flu vaccine for a child. The prepaid card will include an account number that is authorized only for flu vaccines at certain locations by a certain healthcare provider. As a result, the child cannot use the prepaid amount on that card for other purchases. In this exemplary embodiment, the information includes an identifier for a prepaid account, which corresponds to the particular healthcare service and administered location. The information does not include the child's information or the parent's information.

FIG. 2 also shows exemplary implementations of a data encoding area of flu vaccine prepaid card 202. The data encoding area may include an optional shielding element, which allows desired electromagnetic, optical, or radiating signals to penetrate while protecting the data encoding area from physical abuse or damage. Flu vaccine prepaid card 202 may optionally have areas outside of the data encoding area shielded from physical abuse or otherwise acceptable forms of electromagnetic radiation. Some of the acceptable signals that are allowed to penetrate the shielding and may include, but are not limited to, signals accompanying a magnetic field, RFID signals, IrDA signals, visible light, invisible light, modulated laser, and/or modulated RF communication signals. By way of example and not limitation, a selective shielding element may comprise a clear plastic shield, conformal coatings, an opaque plastic shield, or a clear thin film, depending on the implementation of the data encoding area.

Non-limiting examples of the data encoding area are shown at reference numeral 200, and include an integrated circuit or "chip" 204 having contact(s) 206, a magnetic stripe assembly 210, an antenna and/or transceiver 220, and electrical contacts 240. Magnetic stripe assembly 210 may comprise, in the implementation shown as 210A, a reprogrammable magnetic stripe assembly 210B that accepts data and/or commands from a processor and formats and renders that data into a form on a magnetic stripe that is readable by conventional merchant magnetic stripe-reading point of sale (POS) terminals. In this manner, the processor may program a particular account for use in a transaction as a function of user input selecting the account. Alternatively, the processor may erase the magnetic stripe of assembly 210, rendering the card useless in the event of its loss or theft. In the implementation shown as 210A, a magnetic stripe reader can read the magnetic stripe assembly 210B when the magnetic stripe assembly 210B is swiped through the magnetic stripe reader at the point of sale.

Flu vaccine prepaid card 202 can bear, on a surface thereof, information 250, including various indicia, text, symbols, or pictures that may identify the specific healthcare service to be provided to the patient by a healthcare service provider to whom the prepaid card is presented. The flu vaccine prepaid card 202, in some implementations, will not encode data sufficient to identify the patient who is to receive the specific healthcare service. As such, the patient can be anonymous to the entities in the payment processing system (e.g., issuer, acquirer, and transaction handler) as well as to the healthcare service provider who provides the specific healthcare service to the patient. Despite the privacy of the patient being maintained by implementations disclosed herein, the healthcare service provider can still be reimbursed from an account identified by data on the flu vaccine prepaid card 202. Also, the identified account encoded on the flu vaccine prepaid card 202 can correspond to one or more sponsors who are financially responsible to reimburse the healthcare service provider for rendering the specific healthcare service to the patient. As such, the authorization for the cost of the service, and its guaranteed payment to the healthcare service provider, can be provided in real time, without a traditional benefits manager adjudication, without the conventional substantiation process of the healthcare service against an insurance policy or formulary, and without an insurance claims system process. Rather than determining whether the patient has sufficient credit or account balance for a payment, it is determined whether the patient is entitled to a specific prepaid product or procedure.

Memory, such as may be contained in chip 204, can have encoded therein, but is not limited to: (i) an identifier for the type, kind, manufacturer, wholesaler, of the controlled substance and/or its manner of administration, which may be identified, for instance by Universal Product Code, Stock Keeping Unit, or the other indicia (e.g., UPC, SKU, Bar Code data, etc); (ii) a sponsor who is the account holder for the account from which a healthcare service provider is to be paid of the cost of administering the vaccine to the patient; and (iii) other relevant indicia such as a map and/or location of where a flu shot can be obtained.

Continuing with FIG. 2, another implementation of the data encoding area is shown as an antenna and/or transceiver 220. Antenna and/or transceiver 220 may include commonly used loop inductors such as the one shown 220A or in those shown in related ISO standards for RF-readable smart cards. With such an interface, account data may be translated, modulated and transmitted in a manner acceptable by an RF contactless merchant POS terminal, a 802.11 Wi-Fi or Wi-Max network, or by a cellular or RF communications network. For instance, antenna and/or transceiver 220 may receive a wireless communication from a card read-write device, where the wireless communication carries data for a sponsor's account that is to be written in memory to the data encoding area 200.

Electrical contacts 240 are yet another alternative implementation of the data encoding area shown in FIG. 2. With flu vaccine prepaid card 202 possessing physical contacts such as an array of conductive pads or shapes 240A, flu vaccine prepaid card 202 may be placed in physical contact with a merchant's POS terminal, and electrical contacts 240 may establish connectivity to the merchant's financial processing system. The processor may relay account-related information to the merchant's POS terminal through the contact interface, thereby allowing flu vaccine prepaid card 202 to be utilized with the large number of preexisting merchant POS terminals without hardware and/or software upgrades or changes.

An example of the use of a prepaid card for a healthcare service is as follows. A financial institution or other issuer of the prepaid card can receive a request from an employer to distribute prepaid cards for a particular healthcare service (e.g., a flu vaccine) to each of the employees of the employer. The prepaid cards are mailed directly to the employees (and optionally their dependents) with information about the healthcare service and its importance (e.g., information about the flu and why everyone should be vaccinated). The prepaid cards can be mailed as being activated, unactivated, funded, or unfunded. In one optional alternative, upon receipt of the prepaid card, the employee can register the prepaid card on a website, which will activate the card or apply the funds to the account corresponding to the card. The employee receives the prepaid card and can visit a healthcare service provider or a retail pharmacy partner for the healthcare service. Once the healthcare service has been administered, the employee provides the prepaid card to the healthcare service provider or the retail pharmacy partner at the point of sale for payment. Adjudication and payment to the healthcare service provider or retail pharmacy partner can occur immediately. The healthcare service provider or the retail pharmacy partner submits the payment request to an issuer or other financial institution that credits the healthcare service provider's or retail pharmacy partner's bank account. Based on the information read from the card (e.g., an identifier of the employer's account and an identifier of the employee), the issuer can determine which healthcare services or products are authorized for that employee and allocate payment from the employer for those authorized services or products. The corresponding payer (e.g., employee or plan sponsor) can then be billed for the rendered services or a bank account of the corresponding payer can be decremented. When billing the payer after the administration of the healthcare service, the payer can take advantage of the ability to pay for only services rendered and only some payments at a time, rather than being billed in advance for the healthcare services to be administered to employees and their families.

Figure 3:
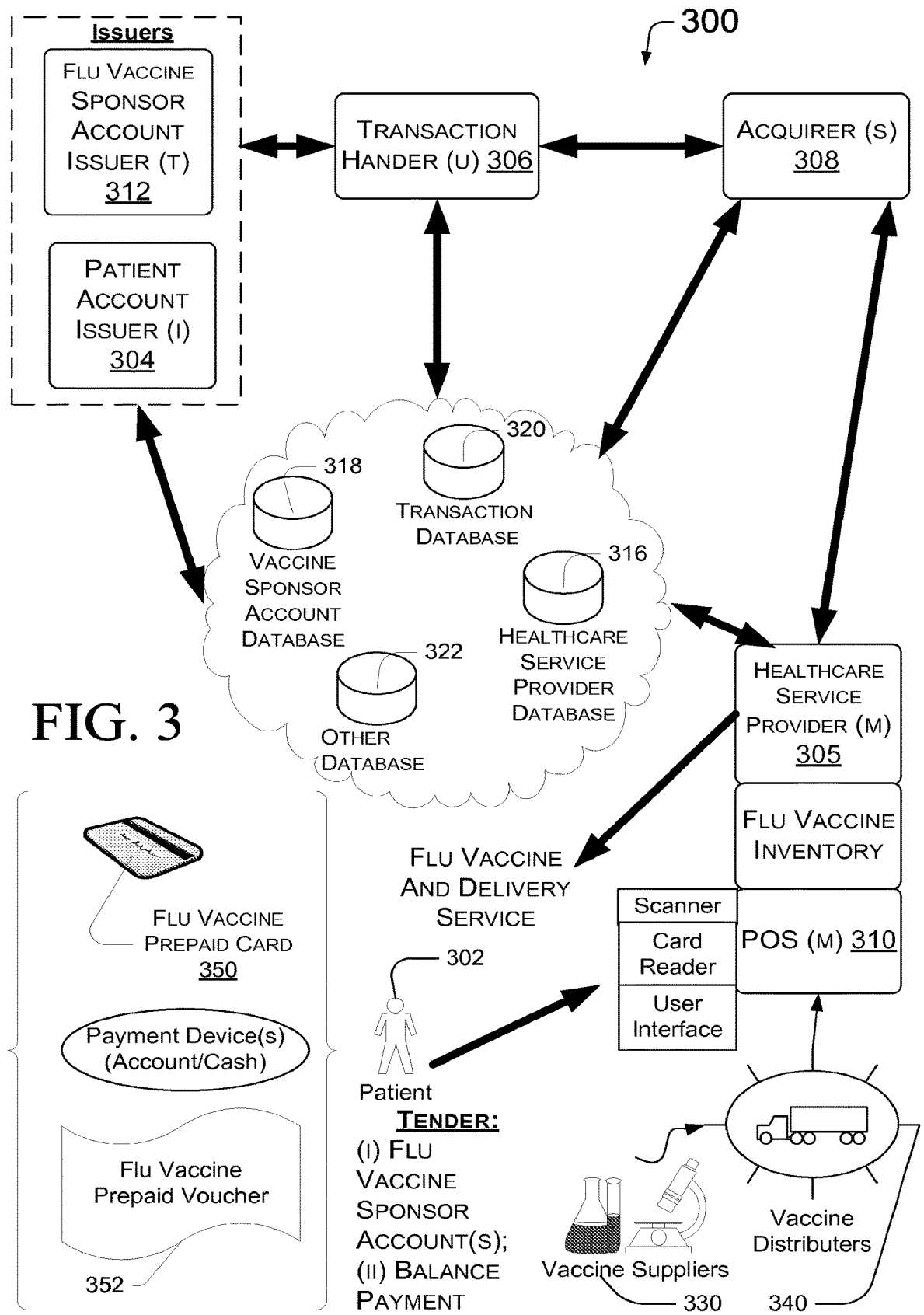
FIG. 3 depicts an environment within a payment processing network shown in FIG. 6 where a prepaid card can be used by a patient to obtain a specific healthcare service to be paid for from an account identified by data encoded on the prepaid card, according to an exemplary embodiment.

FIG. 3 illustrates a general environment wherein a consumer or patient uses a prepaid card, such as prepaid card 202 as shown in FIG. 2, to receive a free, or discounted, flu shot. This environment can be implemented in conjunction with the exemplary payment processing system shown in FIG. 6, discussed in further detail below. One or more vaccine supplier(s) 330 manufacture vaccines for delivery to vaccine distributors 340 who provide vaccine inventory to healthcare service providers 310. Each healthcare service provider (m) 305 has a flu vaccine inventory and a point of sale terminal (POS) (m) 310. The POS terminal (m) 310 has a scanner, card reader, and user interface for performing transactions with consumers on accounts issued to the consumer or another to a different account holder such as a sponsor of a flu vaccine program or campaign.

At POS terminal (m) 310, patient 302 presents to healthcare service provider (m) 305 flu vaccine prepaid card 350 along with the item(s) patient 302 wishes to purchase. Healthcare service provider (m) 305 uses the card reader associated with POS terminal (m) 310 to read the information stored on flu vaccine prepaid card 350, including the account identifier associated with one or more sponsors of the vaccine program or campaign. In certain implementations, flu vaccine prepaid card 350 is read by swiping flu vaccine prepaid card 350 through POS terminal (m) 310 to read data magnetically encoded in its magnetic stripe. In other implementations, POS terminal (m) 310 reads flu vaccine prepaid card 350 using a contactless technology, such as RFID, when patient 302 is near POS terminal (m) 310. In yet other implementations, to be read, flu vaccine prepaid card 350 is inserted into POS terminal (m) 310 such that external contacts on flu vaccine prepaid card 350 establish connectivity with POS terminal (m) 310. In still other implementations, a flu vaccine prepaid voucher 352 is scanned by the scanner of POS terminal (m) 310, or codes thereon input into POS terminal (m) 310 at the user interface.

In certain implementations, other information is also read from flu vaccine prepaid card 350 or printed voucher 352, such as, by way of example and not limitation, an expiration date, an item type, or an item quantity. In such implementations, POS terminal (m) 310 may determine whether the flu vaccine prepaid card is valid for a healthcare service requested by patient 302. This may occur, by way of example and not limitation, by comparing the current date with the expiration date of the flu vaccine prepaid card. In one example, a program for flu vaccines may only be active from October to February, so the prepaid card can only be used during that timeframe. Alternatively, POS terminal (m) 310 may determine whether patient 302 has requested the specific flu vaccine and quantity specified by data on the card. In another example, an issuer or other entity can determine whether the prepaid card is valid in view of an expiration date without requiring the expiration date to be printed on the card or stored as information on the card.

In one implementation, patient 302 additionally provides flu vaccine prepaid voucher 352 to healthcare service provider (m) 305. Flu vaccine prepaid voucher 352 has a bar code printed thereon that identifies the specific healthcare service (e.g., the type, kind, quantity, etc., of flu vaccine) for which the sponsor's account can be use for payment to the healthcare service provider for the benefit of the patient. In such an implementation, the bar code is scanned with a scanner associated with POS terminal (m) 310 to identify the specific vaccine.

In certain implementations, healthcare service provider (m) 305 may additionally enter the cost of providing the vaccine to the patient into POS terminal (m) 310. In such implementations, the amount may also be printed on flu vaccine prepaid voucher 352 (e.g., as a maximum authorized amount). In other implementations, the amount is read by POS terminal (m) 310 from flu vaccine prepaid card 350 (e.g., as a maximum authorized amount). In certain implementations, POS terminal (m) 310 calculates the maximum authorized amount for the specific vaccine. This may occur, by way of example and not limitation, where the cost is valid when the patient is also making other purchases from the healthcare service provider (m) 305.

Upon receipt of flu vaccine prepaid card 350, the transaction is processed similarly to a method described below in connection with an environment 600 depicted in FIG. 6. Healthcare service provider (m) 305 submits an authorization request to acquirer (s) 308 (e.g., the healthcare provider's bank) via POS terminal (m) 310, which includes the account identifier read from flu vaccine prepaid card 350.

In certain implementations, the authorization request may additionally include an account identifier associated with patient 302 where patient 302 has paid an additional amount for the vaccine and/or for still other items by use of the patient's credit card, debit card, or other portable consumer payment device.

Where acquirer (s) 308 is not the same entity as flu sponsor account issuer (t) 312, acquirer (s) 308 forwards the transaction information to a transaction handler (u) 306, who in turn forwards it to flu sponsor account issuer (t) 312 to verify that the account associated with flu vaccine sponsor account issuer (t) 312 contains sufficient funds to reimburse healthcare service provider (m) 305 for the specific healthcare service to be provided to the patient 302. Of course, if the patient 302 is also making other payments using other accounts, other authorization requests are sent to the corresponding patent account issuer (i) 304 of the patent account. When funds are insufficient, the remaining balance can be deducted from another account or a bill can be sent to the sponsor account issuer or the patient.

Upon receipt of a reply from flu sponsor account issuer (t) 312 (i.e., an authorization response), transaction handler (u) 306 forwards the authorization response to acquirer (s) 308, who forwards it to POS terminal (m) 310 of healthcare service provider (m) 305. Where the authorization response contains an approval of the use of the flu vaccine prepaid card, patient 302 can receive the specifically identified flu short service from the healthcare service provider (m) 305 either without cost or at a discount with the balance of the cost being tendered by the patient 302.

In certain implementations, once the discount has been applied to the patient's balance, the healthcare service provider (m) 305 can invalidate or delete the record or value of the flu vaccine prepaid card(s) stored on flu vaccine prepaid card 350 using POS terminal (m) 310. In certain implementations, flu vaccine prepaid card 350 (and voucher 352) may be a one-time use card. In such an implementation, healthcare service provider (m) 305 may forgo returning flu vaccine prepaid card 350 to patient 302. In other implementations, flu vaccine prepaid card 350 may be used to store subsequent flu vaccine credits or service entitlements and therefore is returned to patient 302.

In certain implementations, approval of the transaction for the flu shot service may be more involved. In such implementations, the authorization request includes additional information, by way of example and not limitation, the item, the item type, and/or the sponsor of the flu vaccine prepaid card. In certain implementations this information is forwarded by transaction handler (u) 306 to a third party (not shown) for authentication and/or other processing. In one implementation, healthcare service provider database 316 may be used to, by way of example and not limitation, verify that flu vaccine sponsor account issuer (t) 312 has issued the flu vaccine prepaid card 350 that the patient 302 is attempting to use. In such an implementation, the authorization process may include a comparison, performed by the third party (not shown) of the additional information provided against information stored in healthcare service provider database 316. In yet other implementations, a third party (not shown) adds a notation to an identifier for the prepaid card 350 or voucher 352 stored in healthcare service provider database 316 once it has been used by the patient 202, thereby preventing its use more than once. The third party (not shown) may have direct access to healthcare service provider database 316 or may access healthcare service provider database 316 via transaction handler (u) 306.

In other implementations, the third party (not shown), who may be an agent of the flu vaccine sponsor, uses healthcare service provider database 316 to keep a tally of the flu vaccine prepaid cards used by patients 302. In such an implementation, this information is used by flu vaccine sponsor account issuer (t) 312 in deciding future flu vaccine prepaid cards to issue or for identifying specific patients 302 for targeted advertising. In still other implementations, the additional information includes an identifier for one or more advertisements that are to be, or were, presented to patient 302 at the time that flu vaccine prepaid card 305 or voucher 352 was used by the patient. In such an implementation, after the information is stored in healthcare service provider database 316 by the third party, flu vaccine sponsor account issuer (t) 312 may charge another entity a fee for each time the advertisement is shown to the patient 302. Alternatively, flu vaccine sponsor account issuer (t) 312 may change the advertisement associated with an flu vaccine prepaid card 350 or voucher 352 after the advertisement has been presented with the flu vaccine prepaid card 350 or voucher 352 a given number of times.

In other implementations, vaccine sponsor account database 318 is used. As with healthcare service provider database 316, a third party (i.e., an agent of a vaccine sponsor) may access vaccine sponsor account database 318 directly or via transaction handler (u) 306. Vaccine sponsor account database 318 may contain information regarding the account issued to each vaccine sponsor account issuer (t) 312, where flu vaccine sponsor account issuer (t) 312 is one of the vaccine sponsors. In such implementations, the third party (not shown) uses vaccine sponsor account database 318 to verify that the account identifier read from flu vaccine prepaid card 350 is associated with one of the "R" flu vaccine prepaid card sponsors. Vaccine sponsor account database 318 may additionally be used to verify that the associated account contains funds sufficient to reimburse healthcare service provider (m) 305 for the discount applied. In certain implementations, the aforementioned third party (not shown) is the same entity as transaction handler (u) 306. In other implementations, third party (not shown) is a separate entity from transaction handler (u) 306.

The prepaid card or printed voucher can have a unique identifier or identify a patient in various ways. In one example, the prepaid card or printed voucher can include a patient's name, whereby only the patient can use the prepaid card or printed voucher. In another example, the prepaid card or printed voucher can include a unique identifier, such as a serial number, whereby the unique number can only be processed once for the healthcare service before it is deactivated. Having a unique number, instead of a name, can be useful for providing prepaid cards or printed vouchers to family members of an employee or for distribution by a non-profit agency, where the names of the recipients may not be known. In yet another example, a single prepaid card or printed voucher can designate multiple names or multiple unique numbers for use by more than one person.

When healthcare service provider (m) 305 submits the transaction to a payment processing system 300 via POS terminal (m) 310 for clearing and settlement, the account of flu vaccine sponsor account issuer (t) 312 is debited (e.g., decreased) for the cost of the vaccine. Specifically, healthcare service provider (m) 305 submits a request for payment to acquirer (s) 308. Where acquirer (s) 308 is not the same entity as flu sponsor account issuer (t) 312, acquirer (s) 308 forwards the request to transaction handler (u) 306. Transaction handler (u) 306 in turn requests payment for the vaccine from flu sponsor account issuer (t) 312, where flu sponsor account issuer (t) 312 is the issuer of the account associated with flu vaccine sponsor. Flu sponsor account issuer (t) 312 debits (decreases) the currency in the account and forward the payment to transaction handler (u) 306 who forwards the payment to acquirer (s) 308. Finally, acquirer (s) 308 credits the account of healthcare service provider (m) 305 with the cost of providing the controlled substance, and its administration, to the patient 302.

In certain implementations, the clearing and settlement process may involve a third party (not shown). In such an implementation, the third party may, by way of example and not limitation, record each flu vaccine prepaid card 350 or voucher 352 that has been cleared and settled. This record may be kept in healthcare service provider database 316 or in another separate database 322. Alternatively or in addition to, the third party may verify that the flu vaccine prepaid card 350 or voucher 352 was used in the transaction being cleared and settled. In yet other implementations, the third party may determine the account associated with sponsor of the vaccine in order that transaction handler (u) 306 may request flu sponsor account issuer (t) 312 to debit (decrease) the currency in the corresponding account of the sponsor. In such implementations, the third party may access vaccine sponsor account database 318.

As will be understood by a person of ordinary skill in the art, the process described in connection with FIG. 3 is equally applicable to the situation where a patient uses a prepaid card having multiple flu vaccines service payments credited or stored thereon such that the prepaid card is not a single use card but rather can be used for receiving a plurality of flu shots (e.g., one flu shot for each member of an employee's family up to eight (8) flu shots). In such a situation, the flu vaccine prepaid cards may be provided by different flu vaccine prepaid card sponsors having accounts issued by different issuers. For example, card 350 or voucher 352 may show one or more accounts that, when parsed by the issuer thereof, will attribute the cost of a controlled substance for the vaccine to one account and the cost of administering the controlled substance (i.e., giving the shot) to yet another account. Further, a prepaid flu vaccine card may have multiple different types of flu vaccine shot credits stored thereon that are valid at respectively different healthcare service providers, each having a different acquirer. In one example, a single prepaid card can provide for the payment of multiple healthcare services, such as an influenza shot, a swine flu shot, and an avian flu shot.

Figure 4:
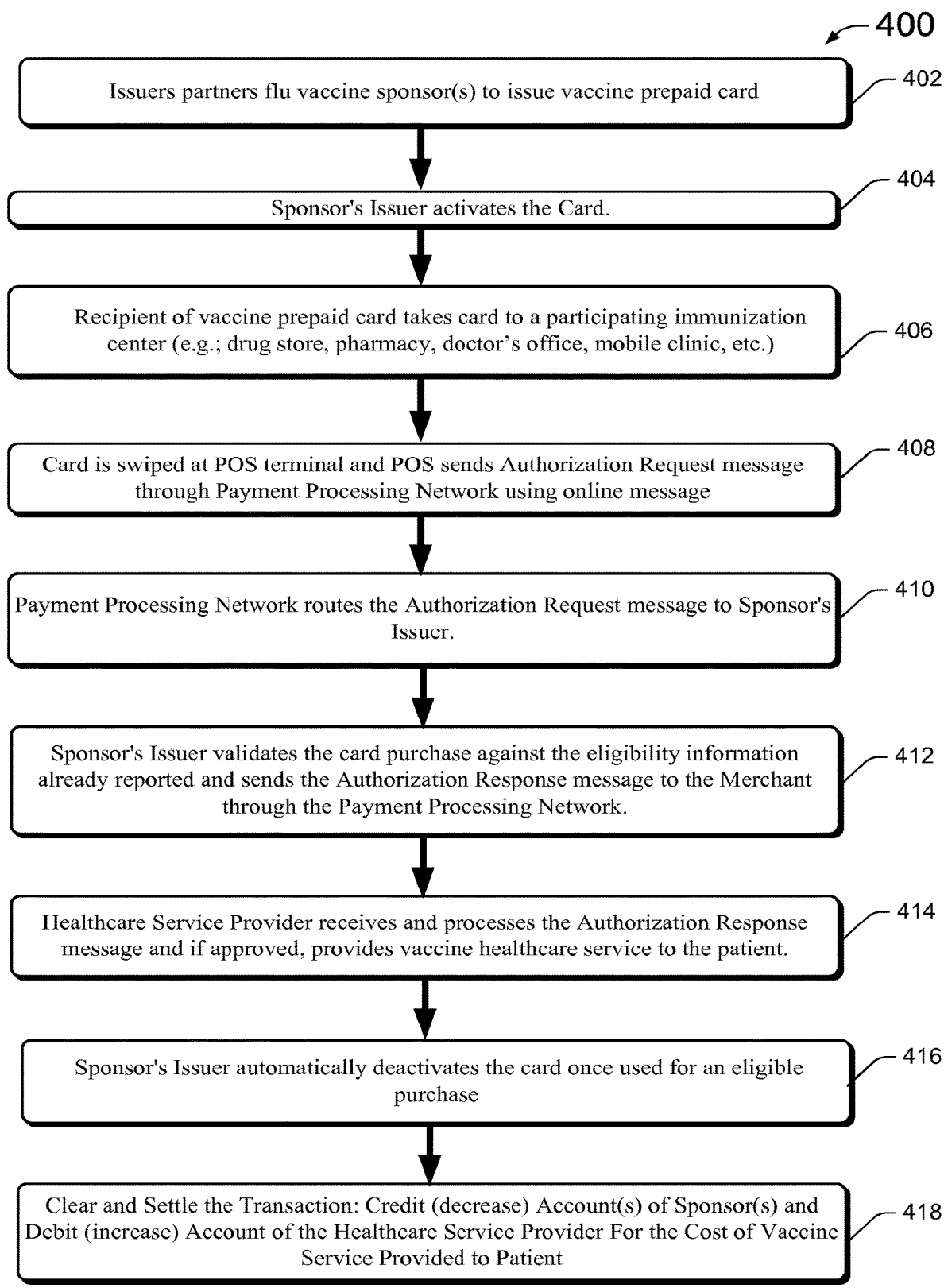
FIG. 4 depicts a flow chart of a first exemplary method in which a prepaid card can be used at a Point of Service terminal for a patient to obtain a specific healthcare service to be paid for from an account identified by data encoded on the prepaid card, according to an exemplary embodiment.

Turning now to FIG. 4, a flow chart of an exemplary method 400 used in a transaction to process a flu vaccine service cost stored on a flu vaccine prepaid card is presented. As indicated by block 402, an issuer would partner with businesses, non-profits, and/or government agencies to issue a vaccine prepaid card, where each partner would sponsor the cost of the flu vaccines, either the cost of the controlled substance, its administration to patients, or both. The flu vaccine prepaid card would be used by patients to obtain a free (or discounted) flu vaccine from participating healthcare service providers, such as retailers with flu shot clinic, doctors, and medical facilities. The flu vaccine prepaid card could be a plastic magnetic stripe card to facilitate authorization, clearing, and settlement through a typical merchant POS system and process as would other consumer purchases that are processed through a payment processing network by a consumer's use of a portable payment device (e.g., an open loop credit/debit/prepaid card). At block 404, an issuer of an account issued to a sponsor of the flu vaccine program or campaign would individually, or in bulk, activate the flu vaccine prepaid card(s).

At block 404, a recipient of a flu vaccine prepaid card takes the card to a participating immunization center, which could be a drug store, pharmacy, doctor's office, mobile clinic, etc. The healthcare service provider (i.e., merchant) would have two POS terminal processing options, seen respectively in FIGS. 4 and 5.

In FIG. 4, product information is captured and eligibility is validated at the POS terminal via an authorization request message sent from the POS terminal. The authorization request message has various sectors, some of which are unused in conventional payment systems. In this exemplary embodiment, one of the unused sectors (e.g., field 104) can be used to identify a healthcare service, a healthcare service provider, or any other identifying information for authorizing the payment of the service. The identifier used in this sector can be a series of numerical digits that can represent a code for a service or service provider (e.g., a retail pharmacy partner). Preferably, for security purposes, the code used in this sector is kept secret from the patient. In one example, when the card is swiped at a POS terminal, the identifier in this sector is matched to see that the payment is for the proper healthcare service before authorizing the payment.

At block 408, the flu vaccine prepaid card is swiped at the POS terminal and the POS terminal sends an authorization request message through a payment processing network using a standard '0100' online message with a drug product code corresponding to the specific flu vaccine service designated in field 104 of the 0100 authorization request message. At block 408, the payment processing network routes the authorization request message to the sponsor's issuer, such as via the healthcare provider's acquirer and the transaction handler. The authorization message can alternatively include an identifier of the sponsoring entity or the patient for processing by the issuer.

At block 412, the flu vaccine sponsor's issuer validates the purchase eligibility and sends the standard 0100 authorization response message to the healthcare service provider (e.g., the merchant) back through the payment processing network via the healthcare provider's acquirer and the transaction handler. At block 414, the healthcare provider receives and processes the standard 0100 authorization response message and if approved, provides the patient with the controlled substance (i.e., vaccine) administered via a shot (or other administration such as by nasal inhalation). At block 416, the sponsor's issuer can automatically deactivates the card or voucher, if spent, once used for an eligible purchase. The healthcare service provider can, in some implementations, automatically receive payment for its vaccine services purchases, along with all other payment processing network transactions (e.g., via clearing and settlement) as shown at block 418.

In an alternative embodiment, a transaction can be completed without using an unused sector of an authorization message. The transaction can be adjudicated by confirming certain information that would strongly suggest that the transaction is for the appropriate healthcare service. For example, the use of such information can include confirming that the service was administered by an authorized healthcare service provider (e.g., a retail pharmacy partner), the transaction is for one item, and the transaction is for the same price as the authorized healthcare service.

Figure 5:
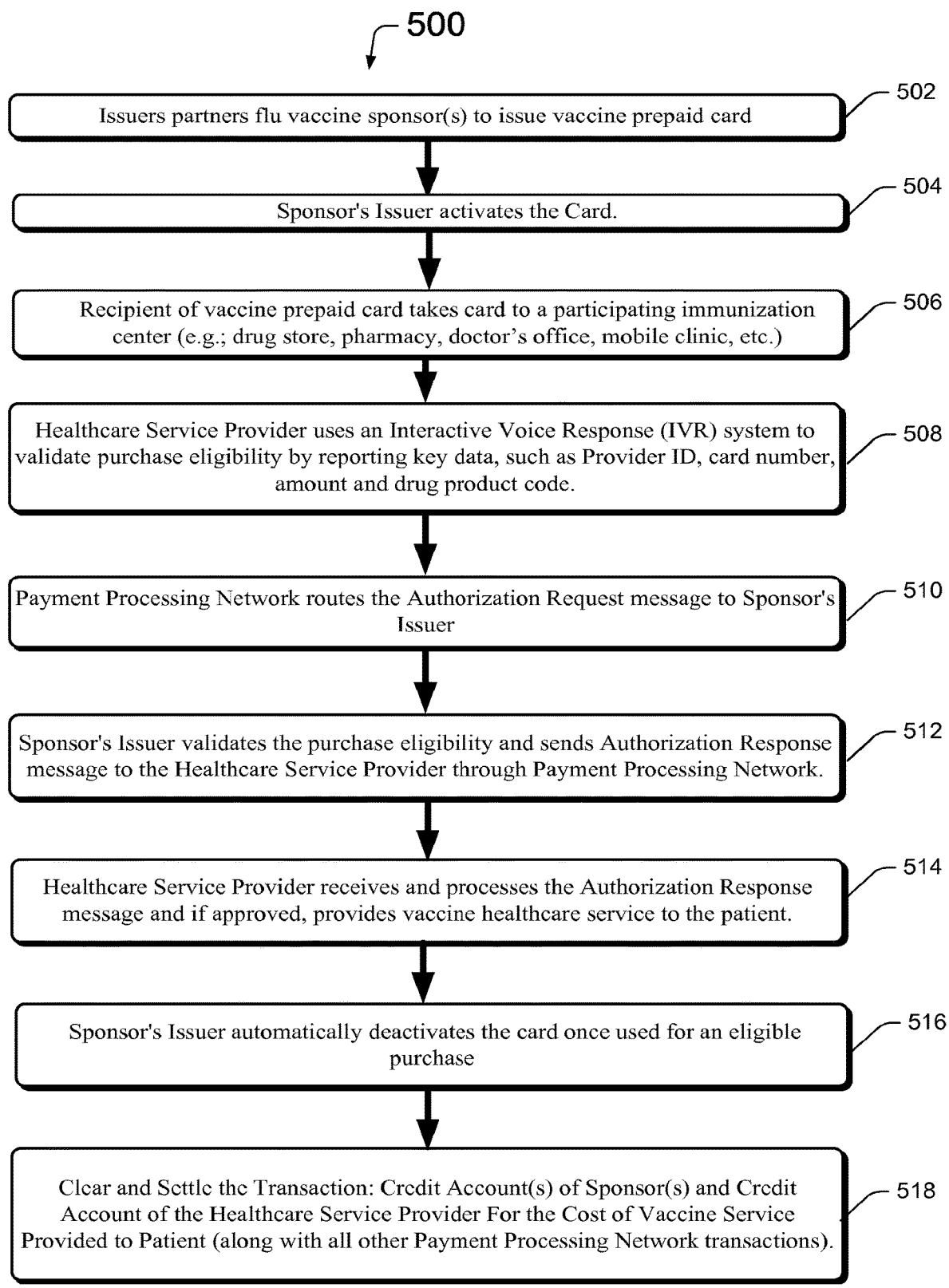
FIG. 5 depicts a flow chart of a second exemplary method for a patient to obtain a specific healthcare service to be paid for from an account corresponding to a prepaid card, according to an exemplary embodiment.

In FIG. 5, blocks 502 to 506 are similar to step 402 to 406 in FIG. 4. In block 508 of FIG. 5, a healthcare service provider, rather than using a POS to read a flu vaccine prepaid card or voucher, uses an Interactive Voice Response (IVR) system to validate purchase eligibility by reporting key data read from the card or voucher, such as Provider ID, card number, amount and drug product code. At block 510, the payment processing network routes the authorization request message to sponsor's issuer, such as via the healthcare provider's acquirer and the transaction handler. At block 512, the flu vaccine sponsor's issuer validates the purchase eligibility and sends the standard 0100 authorization response message to the healthcare service provider (e.g., the merchant) back through the payment processing network via the healthcare provider's acquirer and the transaction handler. At block 514, the healthcare provider receives and processes the standard 0100 authorization response message and if approved, provides the patient with the controlled substance (i.e., vaccine) administered via a shot (or other administration such as by nasal inhalation). At block 516, the sponsor's issuer can automatically deactivates the card or voucher, if spent, once used for an eligible purchase. The healthcare service provider can, in some implementations, automatically receive payment for its vaccine services purchases, along with all other payment processing network transactions (e.g., via clearing and settlement) as shown at block 518.

In an exemplary implementation, a flu vaccine prepaid card can be associated with a sponsor's account number that has a Bank Identification Number (BIN) that is assigned by a transaction handler (e.g., by Visa Inc. or other transaction handler). For instance, the account number can begin with the digit "4." In other implementations, the prepaid card can have a form factor of a physical plastic card design that may contain a bar code that conveys the vaccine drug product code. In other implementations, the flu vaccine service would not be permitted to be combined, by the patient or healthcare service provider, with the purchase of any other good or service. In still other implementations, a private label service for a payment processing network could be used, such as for the flu vaccine sponsor's issuer or for a specific transaction handler (e.g., Visa Inc.—VisaNet), who validates that a flu vaccine prepaid card is being redeemed from an authorized or participating location and/or healthcare service provider (i.e., merchant), and that the funds have been set aside with the sponsor's issuer for the vaccine that has not yet been redeemed, and that the flu vaccine prepaid card is still valid. The payment processing network clearing and settlement system can be used to move funds between the funding party and the vaccine redemption location (e.g., the merchant and/or location thereof, administering the flu shot to the patient).

In certain implementations, individual blocks described above for FIGS. 4 and 5 may be combined, eliminated, or reordered. Also, in certain implementations, instructions (e.g., software) are encoded in computer readable medium wherein those instructions are executed by computing apparatus (e.g., hardware) processor to perform one or more of the blocks for FIGS. 4 and 5. In yet other implementations, instructions reside in any other computer program product, where those instructions are executed by a computer external to, or internal to, a computing system to perform one or more of the blocks of FIGS. 4 and 5. In either case the instructions may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compact flash, smart media, and the like.

Figure 6:
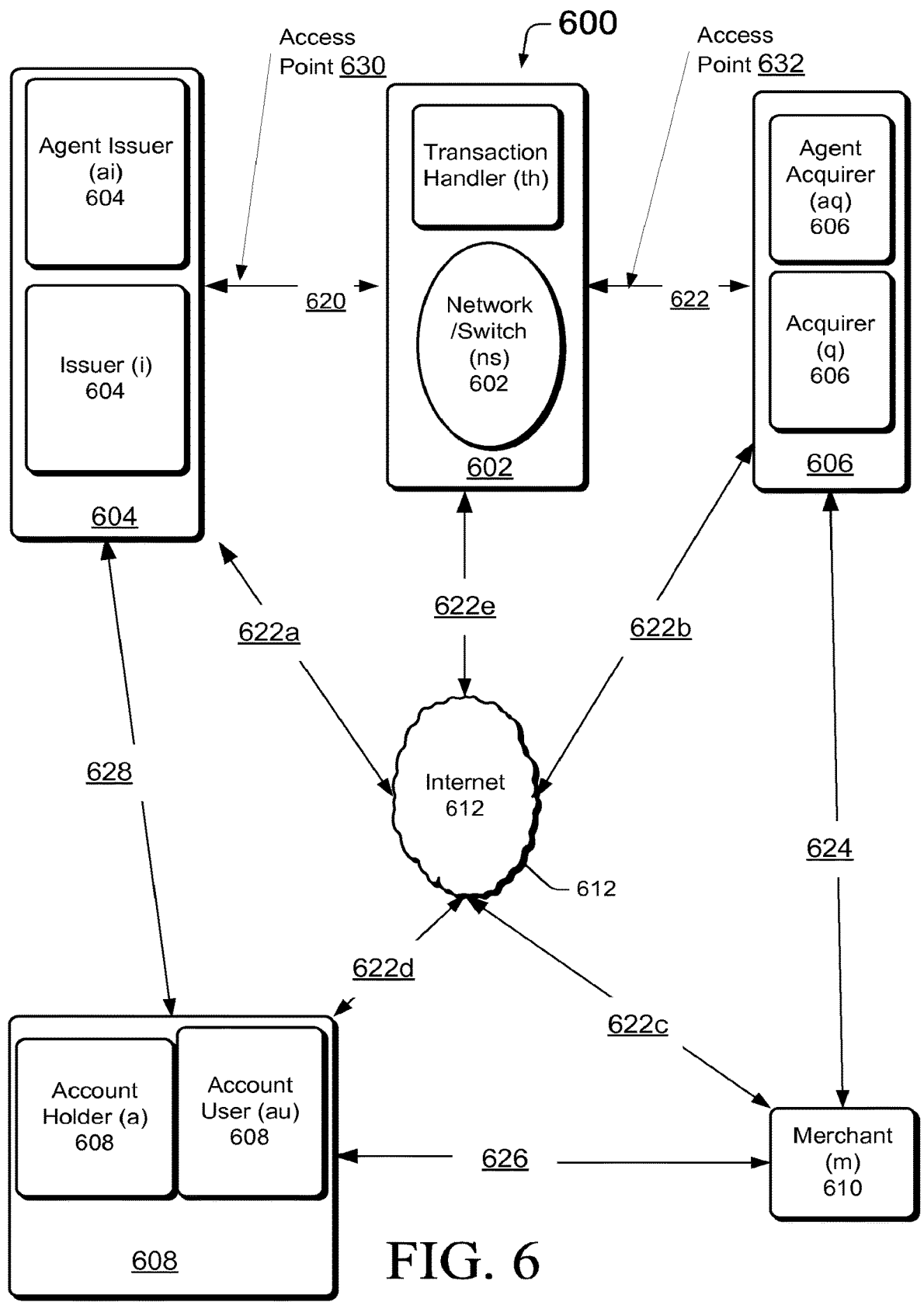
FIG. 6 illustrates an exemplary payment processing network, according to an exemplary embodiment.

Referring to FIG. 6, a transaction processing system 600 is seen to as an environment in which methods 400 and 500 in FIGS. 4 and 5 can be performed, and as a general example for payment processing system 300 in FIG. 3. The general environment of FIG. 6 include that of a merchant (m) 610, such as the merchant, who can conduct a transaction for goods and/or services with an account user (au) (e.g., consumer) on an account issued to an account holder (a) 608 by an issuer (i) 604, where the processes of paying and being paid for the transaction are coordinated by at least one transaction handler (th) 602 (e.g., the transaction handler) (collectively "users"). The transaction includes participation from different entities that are each a component of the transaction processing system 600.

The transaction processing system 600 may have at least one of a plurality of transaction handlers (th) 602 that includes transaction handler (l) 602 through transaction handler (TH) 602, where TH can be up to and greater than an eight digit integer.

The transaction processing system 600 has a plurality of merchants (m) 610 that includes merchant (l) 610 through merchant (M) 610, where M can be up to and greater than an eight digit integer. Merchant (m) 610 may be a person or entity that sells goods and/or services. Merchant (m) 610 may also be, for instance, a healthcare service provider who can administer a controlled substance (e.g., a drug) to a patient in the form of a vaccine, such as flu shot or a nasal inhalation procedure. In a business-to-business setting, the account holder (a) 608 may be a second merchant (m) 610 making a purchase from another merchant (m) 610.

Transaction processing system 600 includes account user (l) 608 through account user (AU) 608, where AU can be as large as a ten digit integer or larger. Each account user (au) conducts a transaction with merchant (m) 610 for goods and/or services using the account that has been issued by an issuer (i) 604 to a corresponding account holder (a) 608. Data from the transaction on the account is collected by the merchant (m) 610 and forwarded to a corresponding acquirer (a) 606. Acquirer (a) 606 forwards the data to transaction handler (th) 602 who facilitates payment for the transaction from the account issued by the issuer (i) 604 to account holder (a) 608.

Transaction processing system 600 has a plurality of acquirers (q) 606. Each acquirer (q) 606 may be assisted in processing one or more transactions by a corresponding agent acquirer (aq) 606, where 'q' can be an integer from 1 to Q, where aq can be an integer from 1 to AQ, and where Q and AQ can be as large as a eight digit integer or larger. Each acquirer (q) 606 may be assisted in processing one or more transactions by a corresponding agent acquirer (aq) 606, where 'q' can be an integer from 1 to Q, where aq can be an integer from 1 to AQ, and where Q and AQ can be as large as a eight digit integer or larger.

The transaction handler (th) 602 may process a plurality of transactions within the transaction processing system 600. The transaction handler (th) 602 can include one or a plurality or networks and switches (ns) 602. Each network/switch (ns) 602 can be a mainframe computer in a geographic location different than each other network/switch (ns) 602, where 'ns' is an integer from one to NS, and where NS can be as large as a four digit integer or larger.

Dedicated communication systems 620, 622 (e.g., private communication network(s)) facilitate communication between the transaction handler (th) 602 and each issuer (i) 604 and each acquirer (a) 606. A Network 612, via e-mail, the World Wide Web, cellular telephony, and/or other optionally public and private communications systems, can facilitate communications 622a to 622e among and between each issuer (i) 604, each acquirer (a) 606, each merchant (m) 610, each account holder (a) 608, and the transaction handler (th) 602. Alternatively and optionally, one or more dedicated communication systems 624, 626, and 628 can facilitate respective communications between each acquirer (a) 606 and each merchant (m) 610, each merchant (m) and each account holder (a) 608, and each account holder (a) 608 and each issuer (i) 604, respectively.

The Network 612 may represent any of a variety of suitable means for exchanging data, such as: an Internet, an intranet, an extranet, a wide area network (WAN), a local area network (LAN), a virtual private network, a satellite communications network, an Automatic Teller Machine (ATM) network, an interactive television network, or any combination of the forgoing. Network 612 may contain either or both wired and wireless connections for the transmission of signals including electrical, magnetic, and a combination thereof. Examples of such connections are known in the art and include: radio frequency connections, optical connections, etc. To illustrate, the connection for the transmission of signals may be a telephone link, a Digital Subscriber Line, or cable link. Moreover, network 612 may utilize any of a variety of communication protocols, such as Transmission Control Protocol/Internet Protocol (TCP/IP), for example. There may be multiple nodes within the network 612, each of which may conduct some level of processing on the data transmitted within the transaction processing system 600.

Users of the transaction processing system 600 may interact with one another or receive data about one another within the transaction processing system 600 using any of a variety of communication devices. The communication device may have a processing unit operatively connected to a display and memory such as Random Access Memory ("RAM") and/or Read-Only Memory ("ROM"). The communication device may be combination of hardware and software that enables an input device such as a keyboard, a mouse, a stylus and touch screen, or the like.

For example, use of the transaction processing system 600 by the account holder (a) 608 may include the use of a portable consumer device (PCD). The PCD may be one of the communication devices, or may be used in conjunction with, or as part of, the communication device. The PCD may be in a form factor that can be: a card (e.g., bank card, payment card, financial card, credit card, charge card, debit card, gift card, transit pass, smart card, access card, a payroll card, security card, healthcare card, or telephone card), a tag, a wristwatch, wrist band, a key ring, a fob (e.g., SPEEDPASS® commercially available from ExxonMobil Corporation), a machine readable medium containing account information, a pager, a cellular telephone, a personal digital assistant, a digital audio player, a computer (e.g., laptop computer), a set-top box, a portable workstation, a minicomputer, or a combination thereof. The PCD may have near field or far field communication capabilities (e.g., satellite communication or communication to cell sites of a cellular network) for telephony or data transfer such as communication with a global positioning system (GPS). The PCD may support a number of services such as SMS for text messaging and Multimedia Messaging Service (MMS) for transfer of photographs and videos, electronic mail (email) access.

The PCD may include a computer readable medium. The computer readable medium, such as a magnetic stripe or a memory of a chip or a chipset, may include a volatile, a non-volatile, a read only, or a programmable memory that stores data, such as an account identifier, a consumer identifier, and/or an expiration date. The computer readable medium may including executable instructions that, when executed by a computer, the computer will perform a method. For example, the computer readable memory may include information such as the account number or an account holder (a) 608's name.

Examples of the PCD with memory and executable instructions include: a smart card, a personal digital assistant, a digital audio player, a cellular telephone, a personal computer, or a combination thereof. To illustrate, the PCD may be a financial card that can be used by a consumer to conduct a contactless transaction with a merchant, where the financial card includes a microprocessor, a programmable memory, and a transponder (e.g., transmitter or receiver). The financial card can have near field communication capabilities, such as by one or more radio frequency communications such as are used in a "Blue Tooth" communication wireless protocol for exchanging data over short distances from fixed and mobile devices, thereby creating personal area networks.

Merchant (m) 610 may utilize at least one POI terminal (e.g., point of sale or browser enabled consumer cellular telephone); that can communicate with the account user (au) 608, the acquirer (a) 606, the transaction handler (th) 602, or the issuer (i) 604. A point of interaction (POI) can be a physical or virtual communication vehicle that provides the opportunity, through any channel to engage with the consumer for the purposes of providing content, messaging or other communication, related directly or indirectly to the facilitation or execution of a transaction between the merchant (m) 610 and the consumer. Examples of the POI include: a physical or virtual point of sale (POS) terminal, the PCD of the consumer, a portable digital assistant, a cellular telephone, paper mail, e-mail, an Internet website rendered via a browser executing on computing device, or a combination of the forgoing. Thus, the POI terminal is in operative communication with the transaction processing system 600.

The PCD may interface with the POI terminal using a mechanism including any suitable electrical, magnetic, or optical interfacing system such as a contactless system using radio frequency, a magnetic field recognition system, or a contact system such as a magnetic stripe reader. To illustrate, the POI may have a magnetic stripe reader that makes contact with the magnetic stripe of a healthcare card (e.g., Flexible Savings Account card) of the consumer. As such, data encoded in the magnetic stripe on the healthcare card of consumer read and passed to the POI at merchant (m) 610. These data can include an account identifier of a healthcare account. In another example, the POI may be the PCD of the consumer, such as the cellular telephone of the consumer, where the merchant (m) 610, or an agent thereof, receives the account identifier of the consumer via a webpage of an interactive website rendered by a browser executing on a World Wide Web (Web) enabled PCD.

Typically, a transaction begins with account user (au) 608 presenting the portable consumer device to the merchant (m) 610 to initiate an exchange for resources (e.g., a good or service). The portable consumer device may be associated with an account (e.g., a credit account) of account holder (a) 608 that was issued to the account holder (a) 608 by issuer (i) 604.

Merchant (m) 610 may use the POI terminal to obtain account information, such as a number of the account of the account holder (a) 608, from the portable consumer device. The portable consumer device may interface with the POI terminal using a mechanism including any suitable electrical, magnetic, or optical interfacing system such as a contactless system using radio frequency or magnetic field recognition system or contact system such as a magnetic stripe reader. The POI terminal sends a transaction authorization request to the issuer (i) 604 of the account associated with the PCD. Alternatively, or in combination, the PCD may communicate with issuer (i) 604, transaction handler (th) 602, or acquirer (a) 606.

Issuer (i) 604 may authorize the transaction and forward same to the transaction handler (th) 602. Transaction handler (th) 602 may also clear the transaction. Authorization includes issuer (i) 604, or transaction handler (th) 602 on behalf of issuer (i) 604, authorizing the transaction in connection with issuer (i) 604's instructions such as through the use of business rules. The business rules could include instructions or guidelines from the transaction handler (th) 602, the account holder (a) 608, the merchant (m) 610, the acquirer (a) 606, the issuer (i) 604, a related financial institution, or combinations thereof. The transaction handler (th) 602 may, but need not, maintain a log or history of authorized transactions. Once approved, the merchant (m)

610 may record the authorization, allowing the account user (au) 608 to receive the good or service from merchant (m) or an agent thereof The merchant (m) 610 may, at discrete periods, such as the end of the day, submit a list of authorized transactions to the acquirer (a) 606 or other transaction related data for processing through the transaction processing system 600. The transaction handler (th) 602 may optionally compare the submitted authorized transaction list with its own log of authorized transactions. The transaction handler (th) 602 may route authorization transaction amount requests from the corresponding the acquirer (a) 606 to the corresponding issuer (i) 604 involved in each transaction. Once the acquirer (a) 606 receives the payment of the authorized transaction from the issuer (i) 604, the acquirer (a) 606 can forward the payment to the merchant (m) 610 less any transaction costs, such as fees for the processing of the transaction. If the transaction involves a debit or pre-paid card, the acquirer (a) 606 may choose not to wait for the issuer (i) 604 to forward the payment prior to paying merchant (m) 610.

There may be intermittent steps in the foregoing process, some of which may occur simultaneously. For example, the acquirer (a) 606 can initiate the clearing and settling process, which can result in payment to the acquirer (a) 606 for the amount of the transaction. The acquirer (a) 606 may request from the transaction handler (th) 602 that the transaction be cleared and settled. Clearing includes the exchange of financial information between the issuer (i) 604 and the acquirer (a) 606 and settlement includes the exchange of funds. The transaction handler (th) 602 can provide services in connection with settlement of the transaction. The settlement of a transaction includes depositing an amount of the transaction settlement from a settlement house, such as a settlement bank, which transaction handler (th) 602 typically chooses, into a clearinghouse bank, such as a clearing bank, that acquirer (a) 606 typically chooses. The issuer (i) 604 deposits the same from a clearinghouse bank, such as a clearing bank, which the issuer (i) 604 typically chooses, into the settlement house. Thus, a typical transaction involves various entities to request, authorize, and fulfill processing the transaction.

The transaction processing system 600 will preferably have network components suitable for scaling the number and data payload size of transactions that can be authorized, cleared and settled in both real time and batch processing. These include hardware, software, data elements, and storage network devices for the same. Examples of transaction processing system 600 include those operated, at least in part, by: American Express Travel Related Services Company, Inc; MasterCard International, Inc.; Discover Financial Services, Inc.; First Data Corporation; Diners Club International, LTD; Visa Inc.; and agents of the foregoing.

Each of the network/switch (ns) 602 can include one or more data centers for processing transactions, where each transaction can include up to 100 kilobytes of data or more. The data corresponding to the transaction can include information about the types and quantities of goods and services in the transaction, information about the account holder (a) 608, the account user (au) 608, the merchant (m) 610, tax and incentive treatment(s) of the goods and services, coupons, rebates, rewards, loyalty, discounts, returns, exchanges, cash-back transactions, etc.

By way of example, network/switch (ns) 602 can include one or more mainframe computers (e.g., one or more IBM mainframe computers) for one or more server farms (e.g., one or more Sun UNIX Super servers), where the mainframe computers and server farms can be in diverse geographic locations.

Each issuer (i) 604 (or agent issuer (ai) 604 thereof) and each acquirer (a) 606 (or agent acquirer (aq) 606 thereof) can use or more router/switch (e.g., Cisco™ routers/switches) to communicate with each network/switch (ns) 602 via dedicated communication systems.

Transaction handler (th) 602 can store information about transactions processed through transaction processing system 600 in data warehouses such as may be incorporated as part of the plurality of networks/switches 602. This information can be data mined. The data mining transaction research and modeling can be used for advertising, account holder and merchant loyalty incentives and rewards, fraud detection and prediction, and to develop tools to demonstrate savings and efficiencies made possible by use of the transaction processing system 600 over paying and being paid by cash, or other traditional payment mechanisms. The VisaNet® system is an example component of the transaction handler (th) 602 in the transaction processing system 600.

In implementing these systems and methods to be performed by a suitably programmed computer, it is intended that the computer have a processor and a computer readable medium, wherein the computer readable medium has program code. The program code can be made of one or more modules that carry out instructions for implementing the systems and methods herein. The processor can execute the instructions as programmed in the modules of the program code.

The systems and methods described can be implemented as a computer program product having a computer readable medium having a computer readable program code embodied therein, the computer readable program code adapted to be executed to implement a method for performing the methods described above. Each step or aspect can be performed by a different module, or a single module can perform more than a single step.

When implemented using a computer, the systems and methods described herein as software can be executed on at least one server, though it is understood that they can be configured in other ways and retain its functionality. The above-described technology can be implemented on known devices such as a personal computer, a special purpose computer, cellular telephone, personal digital assistant (PDA), a programmed microprocessor or microcontroller and peripheral integrated circuit element(s), and ASIC or other integrated circuit, a digital signal processor, a hardwired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

Moreover, the disclosed methods may be readily implemented in software, e.g., as a computer program product having one or more modules each adapted for one or more functions of the software, executed on a programmed general purpose computer, cellular telephone, PDA, a special purpose computer, a microprocessor, or the like. In these instances, the systems and methods of this invention can be implemented as a program embedded on a personal computer such as a JAVA®, CGI or Perl script, as a resource residing on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture.

The steps, methods, processes, and devices described in connection with the implementations disclosed herein, are made with reference to the Figures, in which like numerals represent the same or similar elements. While described in terms of the best mode, it will be appreciated by those skilled in the art that the description is intended to cover alternatives, modifications, and equivalents as may be included within the spirit and scope of the invention as defined by the appended claims and their equivalents as supported by the following disclosure and drawings. Reference throughout this specification to "one implementation," "an implementation," or similar language means that a particular feature, structure, or characteristic described in connection with the implementation is included in at least one implementation of the present invention. Thus, appearances of the phrases "in one implementation," "in an implementation," and similar language throughout this specification may, but do not necessarily, all refer to the same implementation.

The described features, structures, or characteristics of the invention may be combined in any suitable manner in one or more implementations. In the following description, numerous specific details are recited to provide a thorough understanding of implementations of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one implementation of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method comprising:
   receiving, by a point of sale (POS) terminal of a merchant, a payment card, wherein the payment card comprises a chip and a memory encoded with data containing:
   a first identifier identifies a recipient of a specific transaction; and
   a second identifier for an account issued to an account holder by an issuer server of an issuer, wherein the account holder is a party other than the issuer who is financially responsible for paying the merchant for administering the specific transaction to the recipient, wherein the specific transaction is limited to the sale of a prepaid designated service or product;
   reading, by the POS terminal, the chip of the payment card to obtain from the memory the first identifier for the recipient and the second identifier for the account from the payment card;
   receiving, by the POS terminal, an input regarding a performed transaction with the merchant administered to the recipient, wherein the input comprises an indicator of the performed transaction;
   generating and transmitting, by the POS terminal, a request to the issuer server for authorization of the performed transaction, the request comprising the first identifier, the second identifier, and the input, wherein the input is inserted into an unused sector of the request; and
   generating, by the POS terminal, an authorization message for the request when the input corresponds to an approved expense for the first identifier and the second identifier.

2. The method of claim 1, wherein the issuer server deactivates the payment card once used in an authorized transaction.

3. The method of claim 1, wherein the prepaid designated service or product is a prepaid designated healthcare treatment, wherein the prepaid designated healthcare treatment comprises an administration of a substance for which the recipient does not have a prescription; and an administration of the substance by the merchant to the recipient.

4. The method of claim 1, further comprising
   transmitting, by the issuer server, an authorization for the performed transaction on the account when the account has an insufficient balance; and receiving, by the issuer server from the account holder, an amount of an outstanding balance after the performed transaction has been conducted between the recipient and the merchant.

5. The method of claim 4, wherein the issuer server decrements the account of the account holder in the amount of the outstanding balance.

6. The method of claim 4, wherein receiving the amount of the outstanding balance comprises transmitting a bill to the account holder by the issuer server for the performed transaction rendered to the recipient; and receiving funds from the account holder.

7. The method of claim 1, wherein the account holder is an employer; and the recipient is an employee of the employer.

8. The method of claim 1, wherein an account number of the payment card comprises the first and second identifiers.

9. The method of claim 1, wherein the payment card comprising the chip and the memory is further encoded with data containing a set of authorized providers of the prepaid service or product, wherein the issuer server generates an authorization message for the request when the merchant corresponds to one of the set of authorized providers.

10. The method of claim 1, wherein the prepaid designated service or product is a prepaid designated healthcare treatment, wherein the first identifier and second identifier are sufficient for a determination by the issuer server whether the merchant is authorized to administer the designated healthcare treatment to the recipient.

11. The method of claim 1, wherein the indicator of the performed transaction limits the performed transaction to a sale of the prepaid designated service or product.

12. A computer-implemented method comprising:
receiving, by a computer, a request from a sponsoring entity to pay for at least a portion of a specific transaction to provide a prepaid designated service or product to a recipient from an account of the sponsoring entity;
associating, by the computer, the specific transaction for the recipient with the account of the sponsoring entity;
designating, by the computer, an identifier of the specific transaction;
encoding, by the computer, a payment card configured to be read by a point of sale (POS) terminal that generates an authorization request that includes identifier of the specific transaction from the payment card and an input of a performed transaction inserted into an unused sector of the authorization request, wherein the input comprises an indicator of the performed transaction; and
debiting, by the computer, the account of the sponsoring entity based on the identifier; and
transmitting, by the computer, an authorization response to the POS terminal to cause the POS terminal to execute the performed transaction based upon the authorization response.

13. The method of claim 12, further comprising:
deactivating, by the computer, the identifier after authorizing and executing a payment corresponding to the authorization request at the POS terminal.

14. The method of claim 12, wherein the unused sector is a discretionary field of the authorization request.

15. The method of claim 12, further comprising:
associating, by the computer, the identifier of the specific transaction with a specific transaction identification number.

16. The method of claim 12, wherein the payment card is selected from the group consisting of:
a smart card having a Radio Frequency Identification (RFID) tag, a transponder device and a microchip; and
a magnetic stripe card; and
a combination of the foregoing.

17. The method of claim 12, wherein the sponsoring entity is an employer; and the recipient is an employee of the employer.

18. The method of claim 12, wherein the POS terminal is a POS terminal of a merchant, wherein transmitting the authorization response to the POS terminal to execute the performed transaction further comprises determining, by the computer, that the merchant is authorized to provide the prepaid designated service or product to the recipient.

19. The method of claim 12, wherein the indicator of the performed transaction limits the performed transaction to a sale of the prepaid designated service or product.

* * * * *